United States Patent [19]

Akasaka et al.

[11] Patent Number: 4,853,912
[45] Date of Patent: Aug. 1, 1989

[54] PROCESS AND APPARATUS FOR SIMULTANEOUS ERASURE AND RECORDING IN MAGNETO-OPTICAL RECORDING

[75] Inventors: Hideki Akasaka, Yokohama; Masatoshi Sato, Tokyo, both of Japan

[73] Assignee: Nikon Corporation, Tokyo, Japan

[21] Appl. No.: 131,327

[22] Filed: Dec. 8, 1987

Related U.S. Application Data

[63] Continuation of Ser. No. 729,795, May 2, 1985, abandoned.

[30] Foreign Application Priority Data

May 8, 1984 [JP] Japan ................... 59-91360

[51] Int. Cl.$^4$ .............. G11B 11/12; G11B 13/04; G11B 5/02
[52] U.S. Cl. .................... 369/73; 369/100; 360/59; 365/122
[58] Field of Search ........... 369/13, 14, 110, 100; 360/59, 114; 365/122

[56] References Cited

U.S. PATENT DOCUMENTS

| | | | |
|---|---|---|---|
| 3,983,317 | 9/1976 | Glorioso | 369/112 |
| 4,417,290 | 11/1983 | Tanaka et al. | 360/134 |
| 4,472,748 | 9/1984 | Kato et al. | 360/59 |
| 4,495,530 | 1/1985 | Yanagida | 360/59 |
| 4,566,088 | 1/1986 | Yoshida et al. | 369/44 |
| 4,573,149 | 2/1986 | Deguchi et al. | 369/46 |
| 4,612,587 | 9/1986 | Kaneko et al. | 360/114 |
| 4,649,519 | 3/1987 | Sun et al. | 365/28 |
| 4,701,881 | 10/1987 | Tanaka et al. | 365/122 |

FOREIGN PATENT DOCUMENTS 0083347 5/1983 Japan .................... 369/13

OTHER PUBLICATIONS

"Mag. Process of Exchange-Coupled Ferrimagnetic Double-Layered Films", Jap. Journal of Applied Physics, vol. 20, No. 11, Nov./1981, pp. 2089-2095.
Hansen "New Magneto-Optic Memory Concept Based on Compensation Wall Domains", Appl. Phys. Lett., vol. 23, No. 10, pp. 576-578, Nov. 15, 1973.
Nikon, "Magnet-Optic Memories Begin to Look Like a Good Bet", Electronics, Apr. 16, 1987.

*Primary Examiner*—Alan Faber
*Assistant Examiner*—Hoa T. Nguyen
*Attorney, Agent, or Firm*—Shapiro and Shapiro

[57] ABSTRACT

A magneto-optical recording process is produced by irradiating a recording track of a recording medium, in the course of movement thereof, with a main light beam of intensity sufficient for heating the medium to a temperature at which the coercive force thereof is reduced to zero or a very small value in a continuous manner during the recording operation and irradiating a separating area with a subsidiary beam of a modulated intensity, thereby modulating the vertical magnetization of said separating area. A floating magnetic field generated by the thus modulated vertical magnetization generates magnetic fields of mutually different directions, thus forming a record bit on the recording track.

14 Claims, 3 Drawing Sheets

PROCESS AND APPARATUS FOR SIMULTANEOUS ERASURE AND RECORDING IN MAGNETO-OPTICAL RECORDING

This is a continuation application of Ser. No. 729,795 filed May 2, 1985, which is now abandoned.

BACKGROUND OF THE INVENTION

1. Field of the Invention

The present invention relates to magneto-optical recording systems, and more particularly to a process and an apparatus for information recording on a recording medium.

2. Description of the Prior Art

Magneto-optical recording system is a technical term derived from magneto-optical record-regenerating system, and may also be called photothermomagnetic recording system. In the magneto-optical recording system, the recording of binary information is typically achieved by an initializing step of aligning the magnetization of a magneto-optical recording medium, composed of a vertical magnetic layer such as GdCo or GdTbFe, in the upward or downward direction perpendicular to the layer face by means of a strong external magnetic field, and a step of forming a bit having vertical magnetization in the opposite direction. The bit formation is achieved by irradiating a recording track on the recording medium with a laser beam focused to a diameter of 1–2 microns to elevate the temperature of thus irradiated area close to the Curie point of the magnetic layer and thus to reduce the coercive force of said area to zero or almost zero, simultaneously applying a weak external bias magnetic field of opposite direction to invert the direction of magnetization, and terminating the irradiation with the laser beam whereby the irradiated area on the recording track is spontaneously cooled to fix the thus inverted direction of magnetization. In this manner there is formed a bit in which the direction of magnetization is inverted. Thus, if the original direction is taken as "0", the bit represents a signal "1", and the binary information is recorded by the presence and absence or length of the bit.

The binary information thus recorded can be read by irradiating the recording medium with a linearly polarized laser beam and detecting the direction of the plane of polarization in the reflected or transmitted light, which is rotated by the magnetic Kerr effect or Faraday effect. If the plane of polarization of the transmitted or reflected light is rotated by an angle $\theta k$ from the plane of polarization of the incident light when the magnetization is upward with respect to the direction of incident light, there will be obtained a rotation of $-\theta k$ when the magnetization is downward with respect to the direction of incident light. Consequently, if an analyzer is set in such a manner that the principal axis thereof is substantially perpendicular to a plane of angle $-\theta k$, it does not transmit the light from an area of downward magnetization but transmits a portion, represented by $\sin^2 2\theta k$, of the light from an area of upward magnetization. Thus, a photoelectric detector provided behind the analyzer generates electric information corresponding to the recorded magnetic information, in response to the scanning of the recording medium with the laser beam.

For re-using a recording medium which was already used in information recording, it is necessary to initialize the medium again in an initializing apparatus, or to provide a separate erasing head, or to erase the record with the recording head as a preliminary step prior to the information recording. However the initializing unit is bulky and expensive, and cannot therefore be attached to the recording apparatus. Also the use of a separate erasing head increases the manufacturing cost of the apparatus. Furthermore the preliminary erasure with the recording apparatus is not practical as it requires time as long as in recording. It is therefore highly desirable to erase the recorded information in a simple way simultaneously with the recording of new information. For achieving such simultaneous erasure and recording, it should be rendered possible to form a bit with a desired direction of magnetization regardless of whether the magnetization of the recording medium is upward or downward. For this purpose the bias magnetic field should be arbitrarily variable in direction, upward or downward, and, the speed of variation or modulating frequency should be in the order of mega Hz in order to attain a high recording speed. Without these features the magneto-optical record-regenerating system will not be more attractive compared with other recording-regenerating systems.

The bias magnetic field may be generated by a permanent magnet or an electromagnet, but only the latter is usable for modulating the magnetic field with a frequency in the order of mega Hz, since it is difficult to mechanically invert a permanent magnet with such a high frequency. However, even in the case of an electromagnet, a large current is required to apply a sufficiently strong magnetic field in non-contact state to the vertical magnetic layer of the recording medium, and it is difficult to modulate such a current with such a high frequency.

Consequently the bias magnetic field has had to be a fixed one, and simultaneous erasure-recording has been considered impossible in the magneto-optical recording system unless a separate erasing head is provided.

U.S. Pat. No. 4,472,748 discloses a method of simultaneous erasure and recording by inverting the direction of the bias magnetic field at every recording track and irradiating two positions on different recording tracks separated at least by another recording track therebetween respectively with an erasing light beam of a determined intensity and a recording light beam of a modulated intensity. This method, however, does not attain simultaneous erasure and recording on a given point on the recording track but merely effects erasure in a preceding track simultaneously with information recording in a succeeding track, and cannot be therefore called simultaneous erasure-recording in a strict sense.

SUMMARY OF THE INVENTION

An object of the present invention is to enable simultaneous erasure and recording in the magnetooptical recording system.

Another object of the present invention is to provide a novel process for enabling simultaneous erasure and recording with a single pickup head and an apparatus therefor.

According to the present invention, simultaneous erasure and recording are rendered possible by modulating the temperature of the vertical magnetic layer with a frequency in the order of mega Hz and utilizing a floating magnetic field, resulting from temperature-dependent magnetization, as the bias magnetic field.

The recording medium employed in the present invention is provided with coaxial recording tracks or a spiral recording track formed on a vertical magnetic layer and a separating area or separating areas showing vertical magnetization aligned in a determined direction and provided between the recording tracks. The separating area serves to separate neighboring recording tracks and is not used for receiving record bits.

The magneto-optical recording process of the present invention is featured by a step of irradiating a recording track of the recording medium, in the course of movement thereof, with a main light beam of an intensity sufficient for heating the medium to a temperature at which the coercive force thereof is reduced to zero or a very small value in continuous manner during the recording operation and irradiating a separating area with a subsidiary beam of a modulated intensity thereby modulating the vertical magnetization of the separating area.

A floating magnetic field generated by thus the modulated vertical magnetization generates magnetic fields of mutually different directions, thus forming record bits on the recording track.

The apparatus for executing the above-described process of the present invention comprises:

means for displacing the recording medium;

means for irradiating the recording track in a continuous manner during the recording operation with a main light beam of a sufficient intensity for heating the recording medium to a temperature at which the coercive force thereof is reduced to zero or a very small value; and means for irradiating the separating area with a subsidiary light beam modulated according to the information to be recorded thereby modulating the vertical magnetization of the separating area.

In the above-described process or apparatus, the irradiation with the modulated subsidiary light beam generates a temperature change in the separating area corresponding to the beam intensity, whereby the direction of vertical magnetization in the separating area is varied. However certain materials for the vertical magnetic layer show vertical magnetization of the same direction both at high and low temperature levels, or have a compensation temperature between the high and low temperature levels so that the magnitude of vertical magnetization at the high or low temperature level may be insufficient for the floating magnetic field to reach the required magnitude $|Hw|$ as the recording magnetic field, even if the direction of vertical magnetization is inverted between the high and low temperature levels. In such case the information recording is rendered possible by adding, to the modulated floating magnetic field, a fixed bias magnetic field perpendicular to the recording track. The addition is so conducted as to satisfy the following conditions:

$$|H1+Hb| \geq |Hw|$$

$$|H0+Hb| \geq |Hw|$$

wherein H1 is the floating magnetic field at the high temperature level, H0 is the floating magnetic field at the low temperature level, and Hb is the fixed bias magnetic field.

In an embodiment of the present invention, the diameter of the main light beam on the recording medium is selected smaller than the width of the recording track, while that of the subsidiary light beam is selected to include the spot of the main beam and to cover the recording track and the separating areas on both sides thereof. Since an excessively high temperature may result from the overlapping of the continuous main beam and the modulated subsidiary beam, it is desirable to modulate the intensity of the main beam in synchronization with and in opposite sense to the change in the intensity of the subsidiary beam, thereby maintaining a change in intensity of the light beams falling on the recording track within a range of $\pm 20\%$. Examples of the material constituting the vertical magnetic layer are materials which can be rendered amorphous such as GdCo, GdFe, TbFe, TbFeCo, GdTbFe, GdFeCo, GdFeBi and DyFeCo, and those which can be rendered polycrystalline such as PtMnSb, MnCuBi, MnAlGe and MnBi. The vertical magnetic layer, generally of a thickness of 0.01 to 1 micron, is formed on glass, plastic or other substrates, and is covered by a protective layer composed for example of $SiO_2$, glass, SiC, $Si_3N_4$ or AlN. The vertical magnetic layer may be composed of a single layer, or have a two-layered structure composed of a layer of low Curie point and high coercive force and another layer of high Curie point and low coercive force, or composed of layers with mutually different directions of vertical magnetization.

DESCRIPTION OF THE PREFERRED EMBODIMENTS

Figure 1:
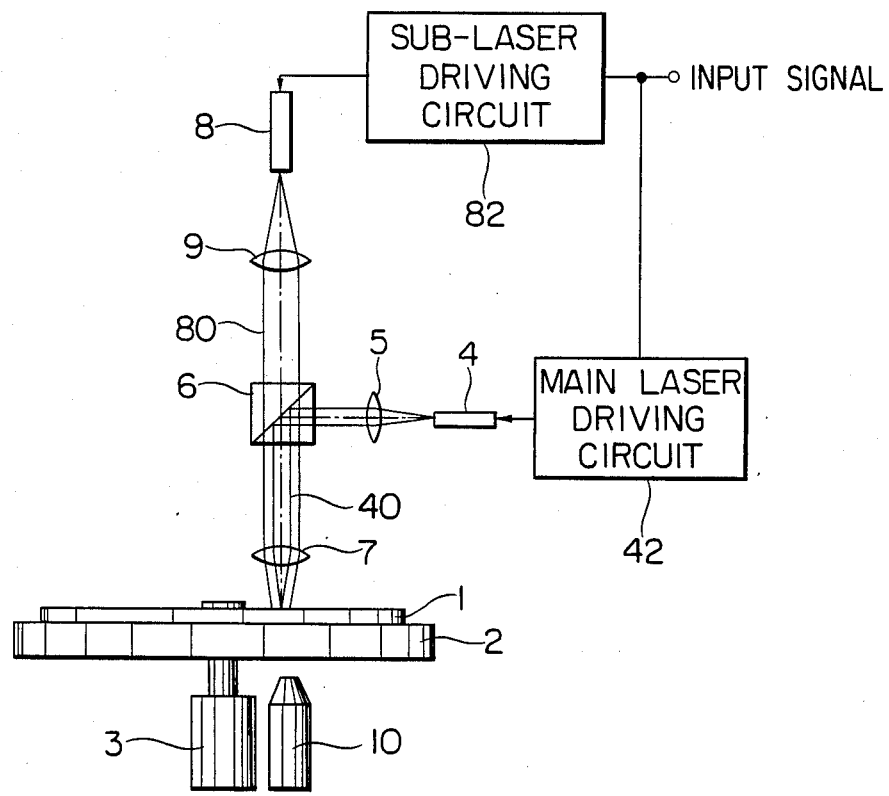
FIG. 1 is a schematic view of the entire structure of the apparatus embodying the present invention.

The entire structure of a magneto-optical recording apparatus of the present invention is schematically shown in FIG. 1.

A disk-shaped magneto-optical recording medium 1 is placed on a turntable 2 and is rotated by a motor 3 at a constant speed.

Figure 2:
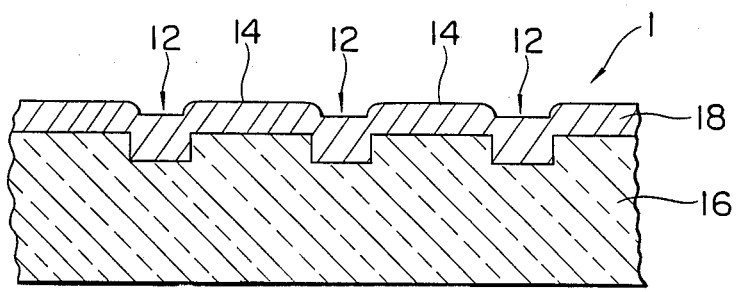
FIG. 2 is a partial cross-sectional view of an embodiment of the recording medium.

As shown in FIG. 2, the recording medium 1 is provided with coaxial or spiral recording tracks 12, which are separated by separating areas 14. The recording medium 1 is prepared by forming coaxial or spiral grooves on a disk-shaped substrate 16, and depositing a vertical magnetic layer 18 on said substrate by a thin film developing technology such as vacuum evaporation or sputtering. The surface of the vertical magnetic layer is covered with a protective layer (not shown). The separating areas 14 having the vertical magnetic layer are formed between the recording tracks 12 corresponding to the grooves on the substrate. Also in a medium in which the recording tracks are not separated in advance by grooving, it is customary to provide a sufficiently wide separating area between the recording tracks in order to avoid crosstalk therebetween.

The separating area 14 always has vertical magnetization, so that the recording track 12 neighboring the separating area 14 receives the influence of the floating magnetic field generated by said separating area 14.

A main beam 40 emitted by a laser unit 4 is transmitted by a collimating lens 5, a half mirror 6 and an objective lens 7 and reaches the recording medium 1. A subsidiary beam 80 emitted by a laser unit 8 is transmitted by a collimating lens 9, the half mirror 6 and the objective lens 7 and reaches said recording medium 1. The laser unit 4 is controlled by a driving circuit 42 to generate the main beam 40 with a determined intensity. The laser unit 8 is controlled by a driving circuit 82 in response to input signals representing information to be recorded, thus generating modulated subsidiary beam 80.

Figure 3:
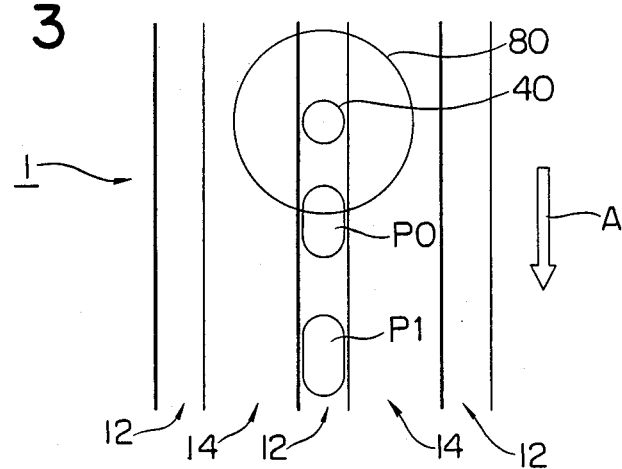
FIG. 3 is a plan view showing the shapes of the main beam and the subsidiary beam irradiating the recording medium.

As shown in FIG. 3, the main beam 40 and the subsidiary beam 80 form coaxial spots on the recording medium. The main beam 40 falls on the recording track 12, with a spot diameter substantially equal to the width of said track. On the other hand, the subsidiary beam 80 has a spot diameter 3-5 times as large as that of the main beam, thus irradiating the separating areas 14.

Figure 4:
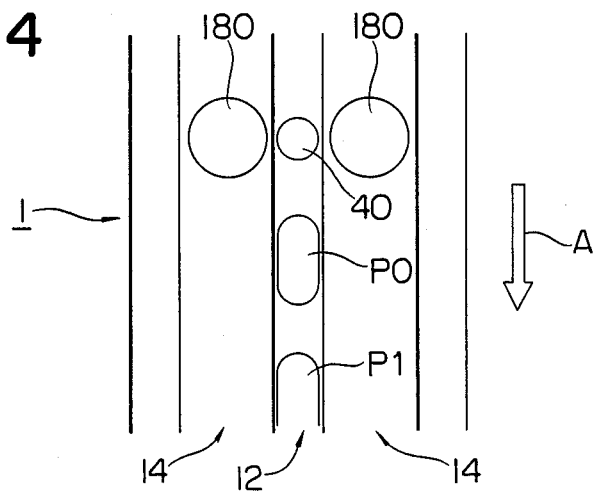
FIGS. 4 and 5 are plan views showing variations respectively in the main beam and the subsidiary beam.
Figure 5:
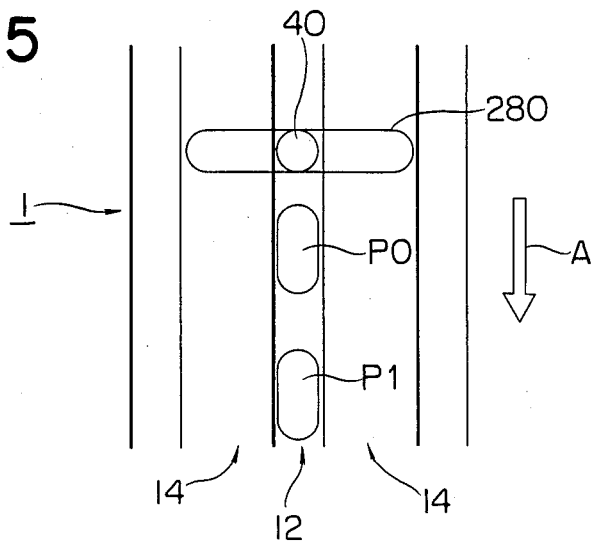

The subsidiary light beam need not form a coaxial spot with the main light beam but may form an independent subsidiary beam spot 180 as shown in FIG. 4, or may form a subsidiary beam spot 280 extended in a direction, as shown in FIG. 5.

The above-described apparatus is further provided with a magnetic field generating unit 10 for applying a fixed bias magnetic field, when required, to the irradiating position of the main light beam.

In the case of FIG. 3 or FIG. 5 where the main light beam and the subsidiary light beam form mutually overlapping spots in the center, the driving circuit 42 modulates the main light beam in response to the input signals and inversely to the modulation of the subsidiary light beam, whereby the variation in the intensity of the overlapping spots is maintained within a range of ±20%.

Now the present invention will be further clarified by certain examples thereof.

EXAMPLE 1

A recording medium was prepared by forming, on a circular glass substrate of a thickness of 1.2 mm, a first vertical magnetic layer of a thickness of 3,000Å composed of $Gd_{24}(Fe_{75}Co_{25})_{76}$ and then a second vertical magnetic layer of a thickness of 2,000Å composed of $Tb_{34}Fe_{66}$. The figures in the above described compositions represent atomic percentages.

In the present example, a description of the grooving of the substrate was omitted for simplifying the process, but a spiral recording track 12 of a width of 1 micron was formed conventionally with a separating area 14 of 3 microns.

Said recording medium was initialized by applying an external magnetic field of +15 killo-oersted (kOe). In the following description, a positive sign indicates an upward magnetic field or magnetization, while a negative sign indicates a downward magnetic field or magnetization. After said initialization, the separating area 14 shows a vertical magnetization of −64 Gauss in the first layer and +240 G in the second layer. The recording magnetic field |Hw| required for information recording on the recording track 12 is 200 Oe.

The recording medium thus initialized was irradiated, as shown in FIG. 3, with a main light beam 40 and a subsidiary light beam 80, with respective diameters of 1 and 5 microns. The intensity of the main light beam was so selected that the vertical magnetic layer reaches 150°-160° C., whereby the coercive force of the recording track was reduced nearly to zero. The intensity of the subsidiary light beam was so selected that the vertical magnetic layer reaches 100°-110° C., whereby the separating area shows a vertical magnetization of −113 G in the first layer and +40 G in the second layer.

Figure 6:
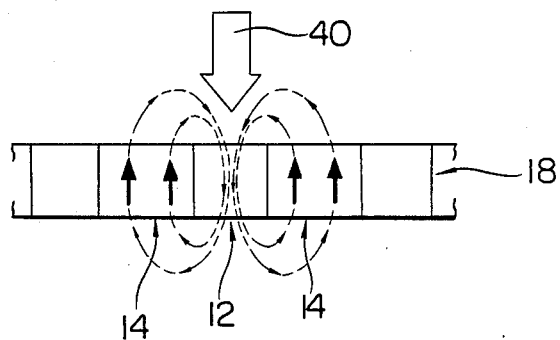
FIGS. 6 and 7 are schematic views showing floating magnetic fields affecting the recording track.
Figure 7:
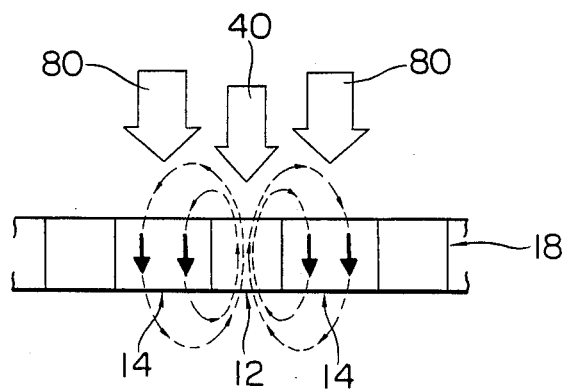

As the result, when the recording medium receives the main light beam but not the subsidiary light beam, the recording track 12 receives a floating magnetic field of −200 Oe from the surrounding separating areas 14 as shown in FIG. 6, and, when the recording medium receives both the main light beam and the subsidiary light beam, the recording track 12 receives a floating magnetic field of +200 Oe from the surrounding separating areas 14 as shown in FIG. 7.

Since either floating magnetic field has an intensity of 200 Oe, enough for recording, a bit P1 with a downward magnetization is formed on the recording track as shown in FIG. 3 in the absence of the subsidiary light beam, and a bit P0 with an upward magnetization is formed in the presence of the subsidiary light beam. It is therefore possible to record new information, without prior erasure of the already recorded information, by modulating the intensity of the subsidiary light beam while continuously maintaining the main light beam. The simultaneous erasure and recording are thus achieved.

EXAMPLE 2

A magneto-optical recording medium was prepared by forming, on a circular glass substrate of a thickness of 1.2 mm, a vertical magnetic layer of a thickness of 2,500Å composed of $Tb_{34}Fe_{66}$, and a spiral recording track of a width of 1 micron was defined as in Example 1 with a separating area of 2 microns.

Said recording medium was initialized with an external magnetic field of +15 kOe, whereby the separating area showed a vertical magnetization of +240 G. The recording magnetic field |Hw| required for information recording on the recording track was 200 Oe.

The recording medium was then irradiated with a main light beam and subsidiary light beam in coaxial manner, with respective diameters of 1 micron and 3 microns. The intensity of the main light beam was so selected that the vertical magnetic layer is heated to 150°-160° C., whereby the coercive force of the recording track was reduced almost to zero. The intensity of the subsidiary light beam was so selected that the vertical magnetic layer is heated to 100°-110° C., whereby the separating area showed a vertical magnetization of 40 G.

Consequently, when the vertical magnetic layer receives the main light beam alone, the recording track receives a floating magnetic field of −731 Oe from the surrounding separating areas, and, when the vertical magnetic layer receives both the main light beam and the subsidiary light beam, the recording track receives a floating magnetic field of −331 Oe. The simultaneous erasure and recording cannot be achieved in this state since the direction of the floating magnetic field remains the same regardless of whether the subsidiary light beam is present or absent. For this reason an upward bias magnetic field Hb of +531 Oe is applied, by the magnetic field generating unit 10, to the irradiating point of the main light beam.

As the result the recording track receives a downward floating magnetic field of −731+531=−200 Oe in the absence of the subsidiary light beam, or an upward floating magnetic field of −331+531=+200 Oe in the presence of the subsidiary light beam.

EXAMPLE 3

A recording medium was prepared by forming, on a circular glass substrate of a thickness of 1.2 mm, a first vertical magnetic layer of a thickness of 2,000 Å composed of $(Gd_{26}Fe_{24})_{90}Bi_{10}$ and thereon a second vertical magnetic layer of a thickness of 2,000Å composed of $Tb_{20}Fe_{80}$, and a recording track and a separating area were defined as in the Example 2.

Said recording medium was initialized with an external magnetic field of +15 kOe whereby the separating area showed a vertical magnetization of +150 G in the first layer and +240 G in the second layer. The recording magnetic field $|Hw|$ required for recording on the recording track was 200 Oe.

With the same main light beam and subsidiary light beam as in the Example 2, the coercive force in the recording track was reduced almost to zero, and the separating area showed a magnetization of +50 G in the first layer and +40 G in the second layer.

As the result, in response to the main light beam alone, the recording track receives a floating magnetic field of −850 Oe from the surrounding separating areas, but in response to the subsidiary light beam in addition to the main light beam, the recording track receives a floating magnetic field of −450 Oe. Since the direction of the floating magnetic field is not changed by the presence or absence of the subsidiary light beam, an upward fixed bias magnetic field Fb= +650 Oe is applied.

Thus the recording track receives a downward floating magnetic field of −850+650= −200 Oe in the absence of the subsidiary light beam, or an upward floating magnetic field of −450+650= +200 Oe in the presence of the subsidiary light beam, thus obtaining a magnetic field $|Hw=200$ Oe, enough for information recording.

EXAMPLE 4

A recording medium was prepared by forming, on a circular glass substrate of a thickness of 1.2 mm, a first vertical magnetic layer of a thickness of 3,000Å composed of $Gd_{27}Fe_{73}$ and thereon a second vertical magnetic layer of a thickness of 2,000 Å composed of $Tb_{34}Fe_{66}$, and a recording track and a separating area were defined as in the Example 1.

Said recording medium was initialized with an external magnetic field of +15 kOe whereby the separating area showed a vertical magnetization of +25 G in the first layer and +240 G in the second layer. The magnetic field $|Hw|$ required in the recording track for information recording was 202 Oe.

With a main light beam and a subsidiary light beam the same as in the Example 1, the coercive force of the recording track was reduced almost to zero, and the separating area showed a vertical magnetization of −25 G in the first layer and +40 G in the second layer since the compensating temperature was exceeded.

As the result, in response to the main light beam alone, the recording track receives a floating magnetic field of −522 Oe from the surrounding separating areas, and, in response to the main light beam and the subsidiary light beam, the recording track receives a floating magnetic field of −118 Oe. The simultaneous erasure and recording cannot be achieved in this state since the direction of the floating magnetic field applied to the recording track remains the same regardless of whether the irradiation with the subsidiary light beam is present or absent. For this reason an upward fixed bias magnetic field Hb= +320 Oe is added.

Thus the recording track receives a downward floating magnetic field of −522+320= −202 Oe in the absence of the subsidiary light beam, or an upward floating magnetic field of −118+320= +202 Oe in the presence of the subsidiary magnetic field.

We claim:

1. An apparatus for recording information signals in recording tracks separated by determined separating areas in a magnetic recording medium having magnetic anisotropy perpendicular to the surface thereof, comprising:
    (a) means for irradiating a part of one of said recording tracks with a main energy beam of a determined intensity sufficient for heating said part to a temperature for substantially dissipating the coercive force in said part;
    (b) means for irradiating a part located in said separating areas adjacent to said one recording track and in the vicinity of the first-mentioned part irradiated by said main energy beam, with a subsidiary energy beam of an intensity modulated by said information signals, simultaneously with the irradiation with said main energy beam, whereby the direction of vertical magnetization in said part, irradiated by said subsidiary energy beam, in said separating area is inverted corresponding to said information signals; and
    (c) means for causing relative movement between said recording medium and said main energy beam thereby displacing said part, irradiated by said main energy beam in said recording tracks.

2. An apparatus according to claim 1, wherein said subsidiary energy beam irradiates the separating areas on both sides of said one recording track.

3. An apparatus according to claim 1, wherein said means for irradiation with said subsidiary energy beam comprises means for forming a light spot of said subsidiary energy beam in such a manner as to be centered on said part irradiated by said main energy beam and to cover the separating areas on both sides of said one recording track.

4. An apparatus according to claim 3, further comprising means for varying the intensity of said main energy beam in synchronization with the modulation of intensity of said subsidiary energy beam, whereby the variation in the beam energies in said part irradiated by said main energy beam is maintained within a determined range.

5. An apparatus according to claim 1, further comprising means for supplying an external magnetic field perpendicular to the surface of said recording medium to said part irradiated by said main energy beam.

6. A process for recording information signals in recording tracks separated by determined separating areas in a magnetic recording medium having magnetic anisotropy perpendicular to the surface thereof, comprising the steps of:
    (a) generating a main energy beam of a determined intensity sufficient for substantially dissipating the coercive force of said recording medium;
    (b) generating, simultaneously with the generation of said main energy beam, a subsidiary energy beam of an intensity modulated according to said information signals;
    (c) focusing said main energy beam on a part of one of said tracks and simultaneously focusing said subsidiary energy beam on a part located in said separating areas adjacent to said one track and in the vicinity of the part on which said main energy beam is focused; and (d) tracing said tracks and said separating areas respectively with the spot of said main energy beam and the spot of said subsidiary energy beam while maintaining the positional relationship of said spots.

7. A process according to claim 6, wherein the spot of said subsidiary energy beam is formed in a part including the spot of said main energy beam and the separating areas on both sides of a track on which the spot of said main energy beam is located.

8. A process according to claim 7, further comprising a step for varying the intensity of said main energy beam in synchronization with the modulation in intensity of said subsidiary energy beam, whereby the variation in the beam energies in the spot irradiated by said main energy beam is maintained within a determined range.

9. A process according to claim 6, further comprising a step for supplying an external magnetic field perpendicular to the surface of said recording medium to the position of the spot of said main energy beam.

10. An apparatus for recording information signals in recording tracks separated by determined separating areas in a magnetic recording medium having magnetic anisotropy perpendicular to the surface thereof, comprising:

first radiation means for radiating a main energy beam;

second readiation means for radiating a subsidiary energy beam;

means for modulating said subsidiary energy beam in response to said recording information signals;

optical means for focusing said main energy beam on a part of one of said tracks and simultaneously focusing said subsidiary energy beam modulated by said modulating means on a part located in said separating areas adjacent to said one track and in the vicinity of the part on which said main energy beam is focused; and means for causing relative movement between said recording medium and said optical means along said recording tracks.

11. An apparatus according to claim 10, wherein said subsidiary energy beam irradiates the separating areas on both sides of said one recording track.

12. An apparatus according to claim 11, wherein said optical means forms a first spot of said main energy beam on said one track and forms a second spot of said subsidiary energy beam so as to be centered on said first spot, said second spot being larger than said first spot.

13. An apparatus according to claim 11, wherein said optical means forms a first spot of said main energy beam on said one track and a pair of second spots of said subsidiary energy beam on said separating areas on both sides of said one track, respectively.

14. An apparatus according to claim 11, wherein said optical means forms a first spot of said main energy beam on said one track and forms a second spot of said subsidiary energy beam so as to be centered on said first spot, said second spot being elongated in a direction substantially perpendicular to said one track.

* * * * *